(12) United States Patent
Ishii (10) Patent No.: US 6,272,448 B1
(45) Date of Patent: *Aug. 7, 2001

(54) APPARATUS AND METHOD FOR TERRAIN MODEL REPRODUCTION

(75) Inventor: Masaharu Ishii, Nagoya (JP)

(73) Assignee: Kobashigawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/817,483

(22) PCT Filed: Oct. 26, 1995

(86) PCT No.: PCT/JP95/02202

§ 371 Date: Apr. 16, 1997

§ 102(e) Date: Apr. 16, 1997

(87) PCT Pub. No.: WO96/13812

PCT Pub. Date: May 9, 1996

(30) Foreign Application Priority Data

Oct. 29, 1994 (JP) .................................................. 6-289295

(51) Int. Cl.$^7$ .................................................. G06F 17/50
(52) U.S. Cl. .............................. 703/2; 702/167; 708/445; 342/22; 342/25; 342/191
(58) Field of Search .......................... 364/578; 701/212; 345/429, 428; 382/113, 199, 266, 278, 274; 703/2, 3, 9; 702/167; 708/445; 342/22, 25, 26, 191, 192

(56) References Cited

U.S. PATENT DOCUMENTS

| | | | |
|---|---|---|---|
| 4,970,682 | * 11/1990 | Beckwith, Jr. et al. | 364/900 |
| 5,053,778 | * 10/1991 | Imhoff | 342/191 |
| 5,140,532 | * 8/1992 | Beckwith, Jr. et al. | 395/101 |
| 5,168,161 | * 12/1992 | Markandey | 250/330 |
| 5,317,689 | * 5/1994 | Nack et al. | 395/163 |
| 5,798,923 | * 8/1998 | Laskowski | 364/420 |
| 5,801,969 | * 9/1998 | Nagahama | 364/578 |
| 5,809,169 | * 9/1998 | Rezzouk et al. | 382/199 |
| 5,815,596 | * 9/1998 | Ahuja et al. | 382/173 |
| 5,835,099 | * 11/1998 | Marimont | 345/431 |

FOREIGN PATENT DOCUMENTS

| | | |
|---|---|---|
| 0292903 | 11/1988 | (EP) . |
| WO-A-9217798 | 10/1992 | (WO) . |
| WO-A-9304437 | 3/1993 | (WO) . |

OTHER PUBLICATIONS

Kaneda et al., Three Dimensiional Terrain Modeling and Display for Environment Assessment, Computer Graphics, 1989, pp. 207–214.*

Bloor et al., "Local Control of Surfaces Generated Using Partial Differential Equations," Computer Graphics, 1994, pp. 161–169.*

(List continued on next page.)

*Primary Examiner*—Kevin J. Teska
*Assistant Examiner*—Thai Phan
(74) *Attorney, Agent, or Firm*—Marger Johnson & McCollom, P.C.

(57) ABSTRACT

The present invention relates to a method and an apparatus which reproduce a digital terrain model (DTM) from contour data with geomorphological consistency and natural features including fine folds. An initial DTM $h_o$ is produced (step 101), and set $h_o$ as an initial value (step 102). Then the operator T which smooths the elevational values along flowing water lines or the neighborhood of the lines is operated on the DTM h (step 103), further the operator B which sets the boundary values by substituting the contour data is operated on the DTM h (step 104). The number n of operating times of the steps 103 and 104 is checked (step 105). If n is less than preset number $n_{max}$, return to the step 103 and if n reaches $n_{max}$, go to the step 106 and the DTM h is output.

20 Claims, 6 Drawing Sheets

OTHER PUBLICATIONS

Muraki, Shigeru; Yokoya, Naokazu; Yamamoto, Kazuhiko, "3D surface reconstruction from contour line image by a Regularization method," SPIE, vol. 1395, Close–Range Photogrammetry Meets Machine Vision, Proceedings ISPRS, Sep. 3–7, 1990, pp. 226–233.

Cheng, Kang; Idesawa, Masanori and Soma, Takashi, "Analysis and Manipulation Methods of Geographic Informations," $9^{th}$ International Conference on Pattern Recognition, Nov. 14–17, 1988, Rome, Italy, IEEE 1988, p. 897–900.

* cited by examiner

APPARATUS AND METHOD FOR TERRAIN MODEL REPRODUCTION

BACKGROUND OF THE INVENTION

1. Field of the Invention

The present invention relates to a method and apparatus which reproduce a digital terrain model (DTM) with natural features including fine folds from contour data.

2. Description of the Related Art

The simplest DTM from contour data is obtained by dividing a region between contours and making the height of each part to be constant which is the average of the elevational values of the enclosing contours. It is called the stacking model. The information of the model is exactly equivalent to that of the contour data. In the model every elevational gap on contours and the flatness between contours become conspicuous where the density of contour is low. Hence it becomes a problem to vary the elevational data between contours and connect the contours by a continuous surface. This is called the terrain reproduction problem from contour data. The necessary information to vary the elevational data is not obtained directly from contour data. Therefore the problem is of an addition of the information that some adequate information ought to be added to contour data in order to obtain an appropriate height surface data. The problem can be divided into two partial problems; the framework of the addition and the content of the addition.

Most of conventional methods are classified into following four types.

(1) The profiles of a terrain are calculated for some directions using interpolation curves such as the spline, and averaged out with weights.

(2) Triangle patches are spanned throughout between contours, and elevational values are interpolated on the triangle patches.

(3) DTM is obtained by smoothing the initial model obtained by a simple procedure such as the stacking model by a two-dimensional low-pass filter.

(4) Regarding contours as a set of points, an estimating function is deliberately chosen with a fitting surface. The surface is then fitted by minimizing the estimating function.

Figure 5:
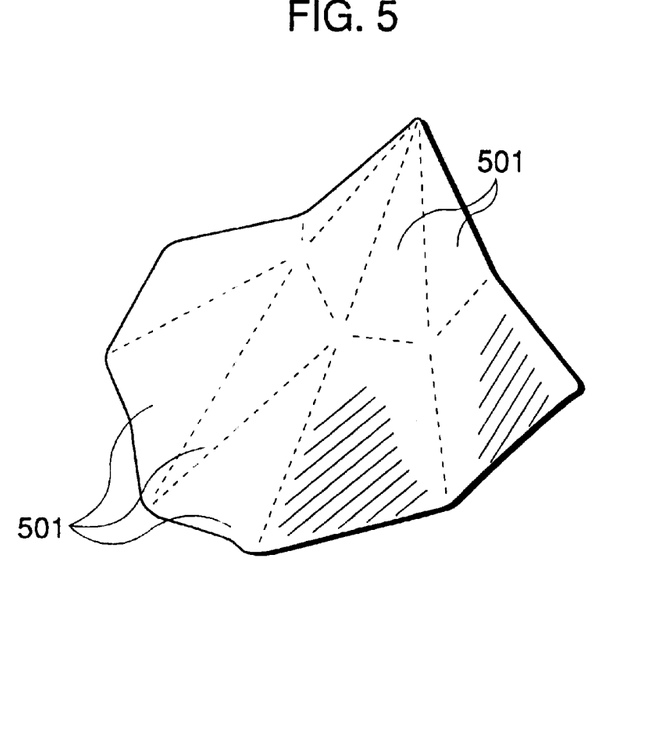
FIG. 5 is a schematic view showing the remaining triangle texture of the landform by a conventional method using triangle patches.
Figure 6:
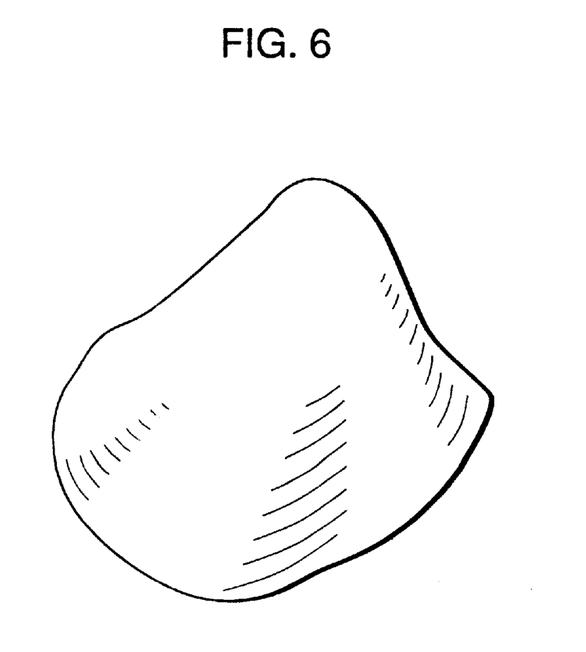
FIG. 6 is a schematic view showing the unusual rounded shape of the landform by a conventional method using a two-dimensional low-pass filter or a fitting surface by minimization.

The outputs of above methods have some problems; (1) artificial steps and ditches or starlike noises appear in DTM, (2) as shown in FIG. 5, the triangle patches 501 will remain as a peculiarity of the landform, (3) and (4) as shown in FIG. 6 the landform becomes an unusual rounded shape without minute folds and wrinkles.

Such problems occur in the conventional methods because physical and geomorphological features of landforms are not given but only artificial and geometrical conditions as the content of the addition to contour data. Also from the viewpoint of the framework of the addition, the methods are faced with some difficulties. The above (1), (2) and (3) methods are in principle of unified processes that the contents of the addition are mostly determined according to the frameworks of the addition. Thus it is almost impossible to add or cut a part of the contents as the need arises.

In the method of (4), the content of the addition can be varied by exchanging the estimating function. However, the choice is small and it is very difficult to adopt a local requirement because the content is after all given by a global-optimization problem.

SUMMARY OF THE INVENTION

A purpose of the present invention is to provide a method and an apparatus which reproduce a DTM from contour data with geomorphological consistency and natural features including fine folds. It solves the problems of geometrical noises and unnatural landform-features appearing in the result owing to merely geometrical and artificial techniques of the conventional methods.

To solve above problems in the present invention, the terrain reproduction problem is formulated as a boundary value problem for an operator on a functional space defined on two-dimensional (2D) plane where contours are set as the boundaries.

The content of the addition can be selected by the choice of the operator and it is easy to adopt local requirements because the framework of the addition is the boundary value problem. Thus a wide range of physical-geomorphological features can be expressed.

Particularly, in an area where erosion by rain dominates the land formation, it is most natural to give the geomorphological feature that the elevational values are smoothed along flowing water lines to the content of the addition. It is fundamental in the terrain reproduction problem on such an area. Then in the present invention, an operator which smooths the elevational values along flowing water lines or neighborhoods of the lines is introduced and it makes possible to give at least the feature to a DTM.

Some other features of rain erosion may be also given to a DTM by constructing an operator to which corresponding operations are added. For example, an effect of accumulation can be adopted into a DTM with an operator which behaves like the Laplace operator in flat areas.

In this application, an operator which smooths the elevational values along flowing water lines or the neighborhood of the lines means an operator at least including this smoothing operation.

As a result, a method and an apparatus of the present invention solve the problems of geometrical noises and unnatural landform-features resulting from the conventional methods and it makes possible to reproduce a DTM from contour data with geomorphological consistency and natural features including fine folds.

DESCRIPTION OF THE PREFERRED EMBODIMENTS

The present invention will be explained below by embodiments.

First, setting a notation, the framework of the addition in the embodiments of the present invention will be expressed.

An arrow "A←B" means the procedure that a content of variable B is substituted into variable A. Let a terrain reproducing domain be D. For the simplification, only a square domain is considered. The domain D is quantized by dividing D into N×N square blocks of same size and each block is expressed by a pair of integers (x,y) (x,y=0,1,2, ... ,N−1). It should be noticed that the above quantization is introduced only for simplifying the explanation. Other quantizations such as triangles with unequal size can be used.

The contour lines are one-dimensional subsets of D. They are expressed by $C_1, C_2, \ldots$, and their elevational values by $v_1, v_2, \ldots$ respectively.

A DTM is expressed by a function of two integer variables (x,y). A value of the function at (x,y) is the elevational value of a corresponding lattice point. Namely, it is expressed by a 2D array h(x,y), for example.

An operator on a functional space defined on a 2D plane is a transformation of a 2D array into a 2D array. The operation of an operator T transforming a 2D array h into a 2D array h' is denoted by h'=T(h). The composite transformation of two operators S and T, h'=S(T(h)) is denoted by S·T.

An example of boundary value problem for an operator is that an equation of h including an operator, h=T(h) is solved for h under the boundary condition that h(x,y)=v for every point (x,y) of C which is a one-dimensional subset of D.

A boundary value problem for an operator is to solve h=T(h), for instance, which is an equation of h with an operator T for h under the boundary condition that h(x,y)=v for every point (x,y) of C which is an one-dimensional subset of D.

Under the above notation, one of the frameworks of the addition in the present invention is formulated by the following boundary value problem.

Let an operator which smooths the elevational values along flowing water lines or the neighborhood of the lines be T. As a terrain model is smoothed, it finally arrives at the equilibrium state where no further smoothing proceeds.

Then the DTM h is expressed by the solution of the boundary value problem that it satisfies the equation h=T(h) under the condition that $h(x,y)=v_i$ at every point (x,y) of $C_i$ (i=1, 2, ... ) respectively.

The equation of this type is adopted because the solution is easily obtained. The method of the present invention can be executed by some other formulation such as T'(h)=0, derived from the different consideration.

If an adequate initial value $h_o$ is given and the operator T is stable in the neighborhood of the initial value, the boundary value problem can be solved by iterative method using the operator B which sets the boundaries by substituting the contour data.

The operation B(h)=h' is defined by the following rule of transformation. If a point (x,y) is included in $C_i$ (i=1,2, ... ), then $h'(x,y)=v_i$, otherwise h'(x,y)=h(x,y).

The operator S is defined by S=B·T. It is known that if h is calculated by h=S·S· ... ·S($h_o$), operating S on $h_o$ iteratively, h becomes an approximate solution for the boundary value problem.

Even when the iterative solution does not converge, an approximate solution can be obtained asymptotically.

Since the equation itself is only an phenomenological model, it is meaningless to require much of the strictness of the solution.

An iterative method other than the above can also be used.

There is the case that shapes of adjacent contours are noncorrelative for some reasons such as two contours apart too much from each other. Even such the case, it is sometimes possible to obtain a natural result by proceeding a modificatory filtering that is an iterative operation of only T (excluding B) to the obtained approximate solution h for several times. This is a method that gives the content of the addition possessed by the operator priority over the information of contour data (It is an invention corresponding to claim 6).

Figure 1:
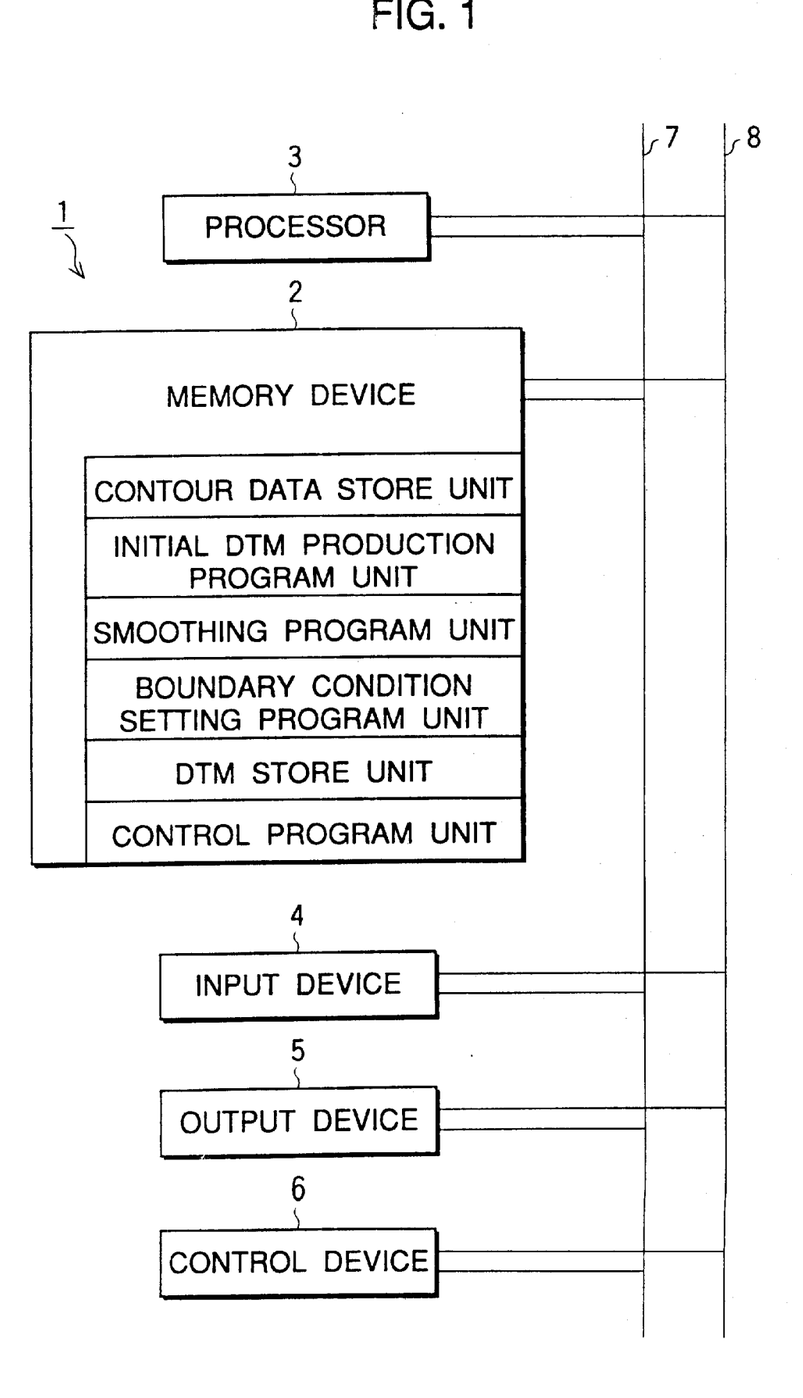
FIG. 1 is a block diagram showing an apparatus for executing the DTM reproduction in Embodiment 1 or Embodiment 2 of the present invention.

The hardware costitution of an apparatus of an embodiment will be explained referring to the block diagram in FIG. 1.

The apparatus 1 of the embodiment has a memory device 2, a processor 3, an input device 4, an output device 5 and a control device 6, and they are connected mutually by bus lines 7 and 8.

The memory device 2 is provided with:

- a region for storing contour data, i.e., the contour data store unit;
- a region for storing a program to produce the initial DTM, i.e., the initial DTM production program unit;
- a region for storing a program to operate the operator which smooths elevational values of the input DTM along flowing water lines or the neighborhood of the lines, i.e., the smoothing program unit;
- a region for storing a program to set the boundary conditions, i.e., the boundary condition setting program unit;
- a region for storing the DTM generated by the apparatus, i.e., the DTM store unit; and
- a region for storing a control program such as OS, i.e., the control program unit.

The processor 3 is a CPU and other related wares. The input device 4 constitutes of for example a digitizer, a mouse, a keyboard, a numerical file, and possibly a light pen. The output device 5 is for example a numerical file or a relay of network. The control device 6 controls the respective devices for executing the program.

Next, the elementary action of the apparatus of the embodiment is explained with reference to the flowchart of FIG. 2.

First, the initial DTM $h_o$ is produced (step 101), and set the $h_o$ as an initial value (step 102).

Then the operator T which smooths the elevational values along flowing water lines or the neighborhood of the lines is operated on the DTM h (step 103), further the operator B which sets the boundary values by substituting the contour data is operated on the DTM h (step 104). The number n of operating times of the steps 103 and 104 is checked (step 105). If n is less than preset number $n_{max}$, return to the step 103 and if n reaches $n_{max}$, go to the step 106 and the DTM h is output.

Figure 2:
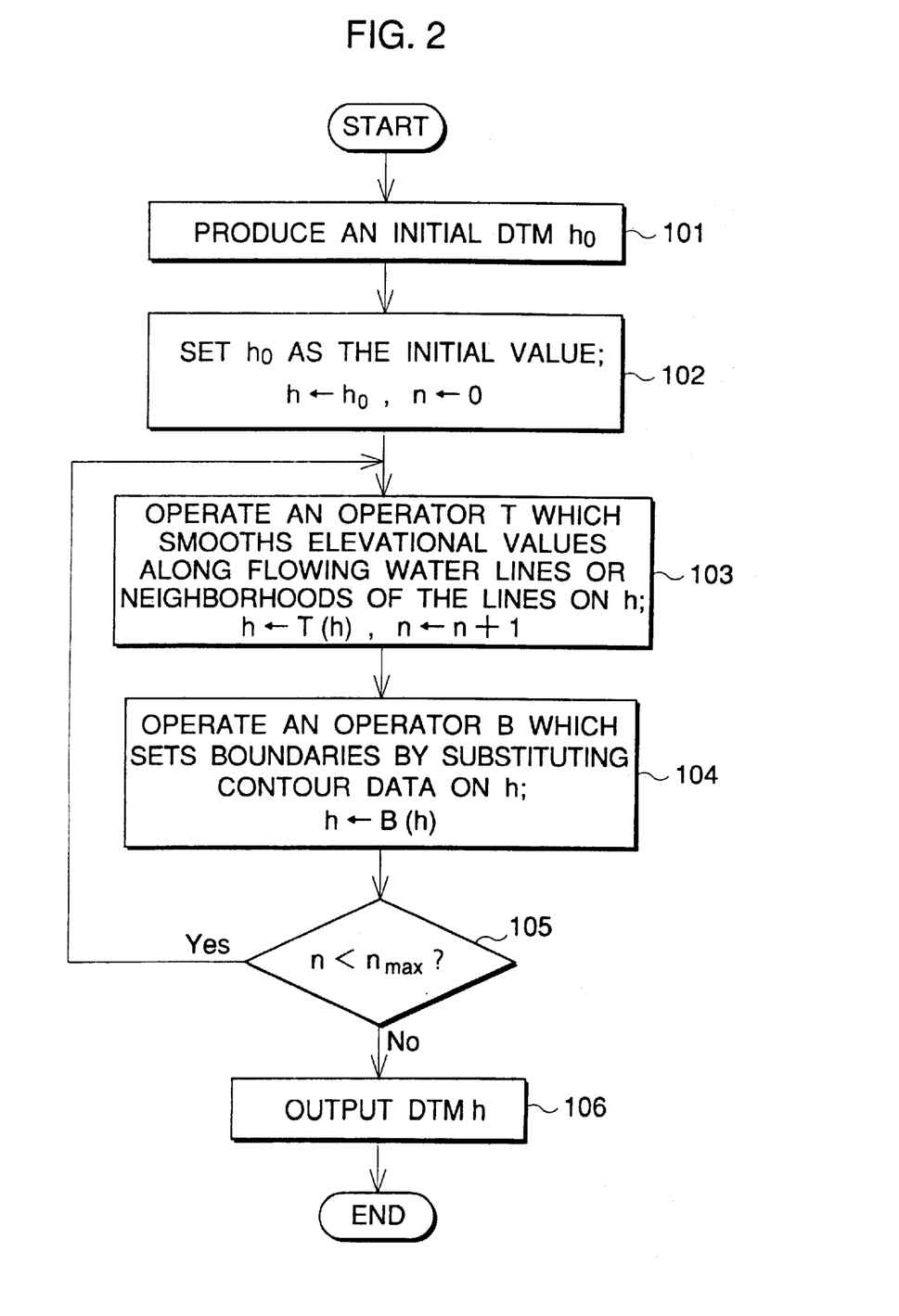
FIG. 2 is a flowchart of Embodiments of the present invention.

In the flowchart of FIG. 2, the first means which produces the initial DTM from contour data consists of the step 101 and the step 102, and the second means which smooths the elevational values along flowing water lines or the neighborhood of the lines consists of the steps from 103 to 106.

By selections of the operator and extensions of the constitution of the apparatus including the two means, various kinds of embodiments of the present invention will be possible.

Since the first means is common in every embodiment, it is explained here. The definitions of operators and the extensions of constitution of the apparatuses will be explained in the following embodiments.

As the first means, for example, the succeeding two procedures can be adopted. The stacking model is produced from contour data and it is set as the initial terrain model of the iterative solution method.

The second procedure is trivial, thus, the first is shown. A stacking model is easily made by an area-painting technique of computer graphics. One point is picked up in an area enclosed by contours and the point is set as the seed of the area-painting. Then the area is painted with the color expressing the elevational value, which can be determined from the contours.

Other than the stacking model, some terrain models without conspicuous noises, for example, an interpolated model with triangular patches can be used for the initial terrain model.

EMBODIMENT 1

In a first embodiment, all the calculations at each point including the determination of flowing water lines and the smoothing of elevation values are executed on the point and its eight-points neighbourhood. Since the calculations are local, the integrator part of the flowing water lines is dispensable and the implementation becomes easy.

The operation of the smoothing operator T on DTM h at a point (x,y) is defined by the followings. The explanation is made referring to FIG. 3.

Figure 3:
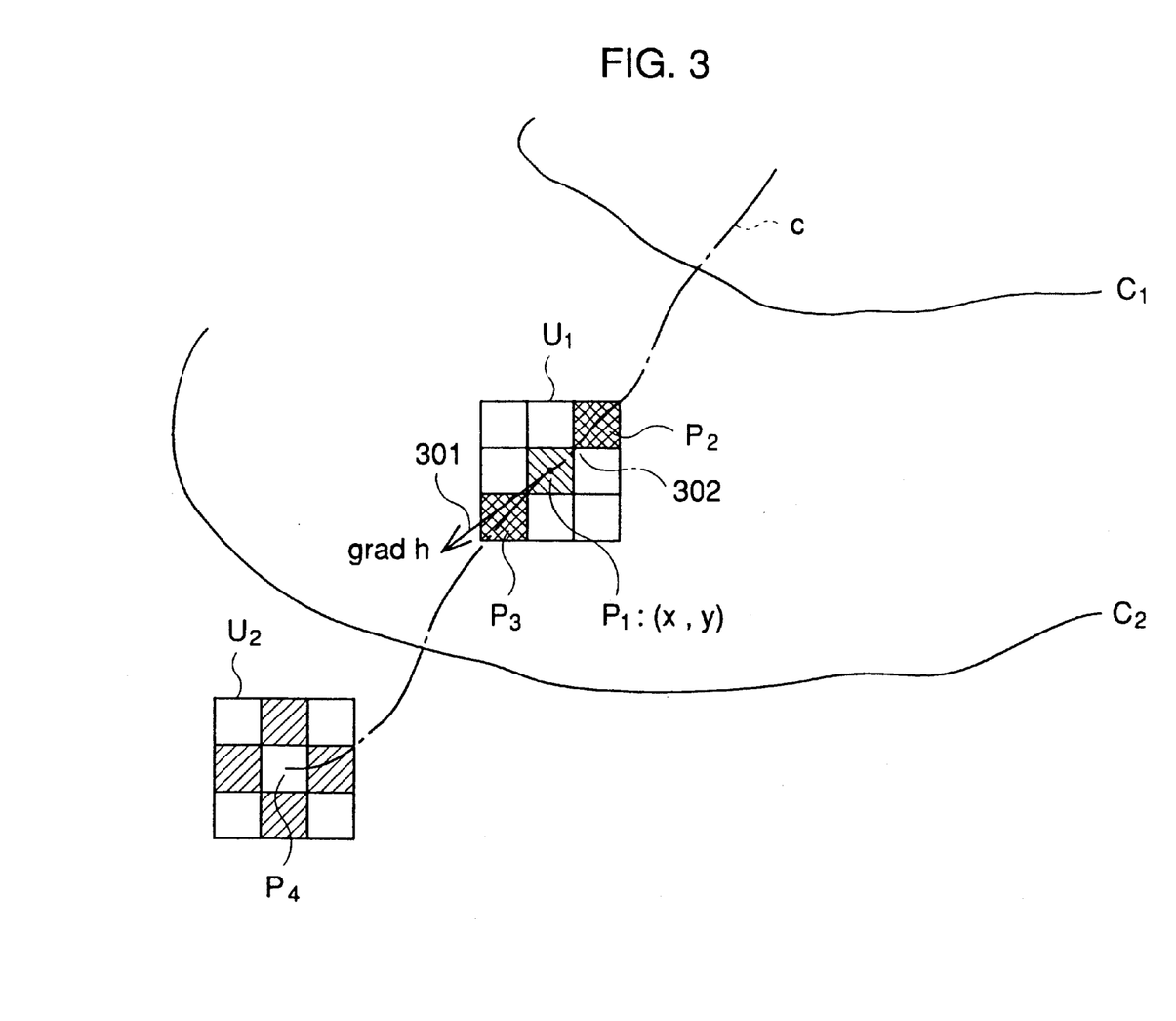
FIG. 3 is a schematic view explaining an operator in Embodiment 1 of the present invention.

(1) From the elevational values of a point (x,y) and its eight-points neighborhood, the gradient vector grad $h(x,y)$ is determined. All elevational values of the points in the neighborhood should be used to calculate the gradient vector.

(2) In the case that the gradient vector is not null on the point (x,y) (such a point is shown by $P_1$ in FIG. 3). The smoothing operator $T_o$ is taken action. The operation $h'=T_o(h)$ is defined as follows:

1) The gradient vector (indicated by 301 in FIG. 3) is quantized into the closest one of four directions which are horizontal, vertical, 45 degree upper-right and 45 degree upper-left. The gradient vector 301 in FIG. 3 is quantized as the 45 degree upper-right direction.

2) The point $P_1(x,y)$ and two points $P_1$, $P_2$ from its eight-points neighbourhood ($U_1$, in FIG. 3) on which the line of the quantized direction passes are picked up and a set of these three points is considered as the local flowing water line 302 in FIG. 3.

3) Some weights, which total sum is one, is given to execute the smoothing. The elevational values on the local flowing water line are averaged with the weights, and this gives the new elevational value $h'(x,y)$ on the point $P_1:(x,y)$. A set of weights whose elements are 0 for $P_1$ and ½ for $P_2$ and $P_3$ in FIG. 3 is given as one of the examples.

(3) In the case that the gradient vector is null (such a point is shown by $P_4$ in FIG. 3).

To extend a flowing water line (c in FIG. 3), the elevational values on the point $P_4$ and its eight-points neighborhood ($U_2$ in FIG. 3) are averaged with weights whose total sum is 1. The weights are set to execute the two-dimensional smoothing. This procedure gives the new elevational value. A set of weights whose elements are ¼ for the four shaded points around $P_4$ in FIG. 3 and 0 for the other points is given as one of the examples.

In the case of (2), the smoothing means is not only restricted to the above but may be a filter directly depending on the gradient vector or a non-linear filter.

In the case of (3), the smoothing means can also be one of non-linear filters. For example, a non-linear operator defined by $$h'(x,y)=(h(x-1,y)+h(x+1,y))\cdot|h_x|/4(|h_x|+|h_y|)+(h(x,y-1)+h(x,y+1))\cdot|h_y|/4(|h_x|+|h_y|),$$

where $h_x=h(x+1,y)-h(x-1,y)$ and $h_y=h(x,y+1)-h(x,y-1)$, can be used in (3). If a smooth DTM is given as the initial value, the operator that only consists of (1) and (2) may be used because the above case (3) rarely occurs for such the initial value. If the operator T is implemented in the flowchart shown in FIG. 2 and the operations are executed, then the DTM is obtained. The present embodiment solves the difficulty that geometrical noises and unnatural features appear in the output.

EMBODIMENT 2

In a second embodiment, the calculational area of the operator is extended to execute the smoothing on somewhat global area, and an integrator becomes necessary to obtain the flowing water line with enough length. Further, the degree of the smoothing is decreased to obtain clear ridges and valleys.

The operation of the smoothing operator T on DTM h is defined below.

(1) The gradient vector field, grad h of the DTM h, is determined.

(2) From the vector field, discrete integral calculation is executed to obtain the flowing water line. The line consists of consecutive lattice points that passes the point (x,y). Its parametrization is defined by the following.

$$c(t)=(c_1(t), c_2(t))\ (c(0)=(x,y),\ c(t)\ne c(t+1))$$

It should satisfy the condition that a inner product $(c(t)-c(t-1), c(t+1)-c(t))$ is positive.

(3) In the case that the flowing water line does not terminate in an area necessary for the smoothing. The smoothing operator $T_1$ whose operation $h'=T_1(h)$ is defined by $$h'(x,y)=\Sigma w(c(t)-(x,y))h(c(t))/\Sigma w(c(t)-(x,y))$$

is operated. Here, $\Sigma$ expresses the sum for every t which satisfies the condition: $w(c(t)-(x,y))\ne 0$. For example, the weight w is given by $$w(x,y)=\exp(-(x^2+y^2)/(2\sigma^2))\ (\text{for } -3\sigma<x,y<3\sigma,\ \sigma: \text{constant}),$$

$$w(x,y)=0\ (\text{otherwise}).$$

The example is Gaussian distribution type. One of the simplest operators is shown here, and any other operator such as a non-linear filter can be used.

(4) In the case other than (3)

1) It is decided whether a point (x,y) belongs to a ridge-valley area or not.

Here, a ridge-valley area denotes an area where a ridge or a valley exists. The decision, for example, is executed by the following procedure: Variables $a_+$, $a_-$, $b_+$ and $b_-$ is introduced as $$a_+=h(x+1,y)-h(x,y),\ a_-=h(x-1,y)-h(x,y),$$

$$b_+=h(x,y+1)-h(x,y),\ b_-=h(x,y-1)-h(x,y).$$

A point is in a ridge-valley area if $a_+\cdot a_->0$ or $b_+\cdot b_->0$ satisfies and otherwise not. The procedure is simply one of the examples and a more global procedure can be used for the decision.

2) In the case that a point (x,y) belongs to the ridge-valley area.

The smoothing operator $T_2$ whose operation $h'=T_2(h)$ is defined by $$h'(x,y)=(h(x,y)+w_d(x,y)\cdot h_L(x,y))/(1+w_d(x,y))$$

is operated. Here, $h_L(x,y)$ is defined as $$h_L(x,y)=(h(x-1,y)+h(x+1,y)+h(x,y-1)+h(x,y+1))/4$$

and the $w_d(x,y)$ is a weight depending on the degree of ridge or valley on a point (x,y). For example, the weight is given by a function of the Laplacian h (physically speaking, the amount of water flow into a point). Various other techniques can be considered to define $T_2$. For example, $W_d$ can be set as an increasing function which depends on the distance from a point where the gradient vector vanishes and some 2D non-linear filters can be also used instead of the $h_L$.

3) In the case other than 2).

The smoothing operator whose operation is defined by $h'(x,y)=h_L(x,y)$ ($h_L$ is defined above) is operated.

In the above (4), a simpler constitution can be considered which executes the smoothing procedure of the above 3) without the ridge-valley area decision. In this case, it is regarded as a constitution simply replacing $T_o$ of Embodiment 1 with $T_1$.

The above operator T is implemented in the flowchart in FIG. 2 and the operations are executed to obtain the DTM. The present embodiment solves the problems in an area with low-dense contours, keeping the ridges and valleys from being flattened and sustaining the sharpness of terrain surface. As the result, it can reproduce the DTM from the contour data with geomorphological consistency and natural features including fine folds.

EMBODIMENT 3

In a third embodiment, an extended constitution for the fast calculation will be shown. It consists of an interpolation method and the above iterative operations with several unit sizes of quantization.

When the iterative method is used in solving the present boundary value problem, the number of the iteration necessary to reach the equilibrium state of the smoothing is approximately proportional to the horizontal interval of contours in general.

For example, if the unit size of the quantization is changed four times as large as the original unit size and each side of the domain D is divided into N/4, the number of blocks in each interval of contours becomes ¼ of the original number. The number of the iteration is thus reduced to ¼ of the original number. The number of lattice points which are used in the calculation is also reduced to ¼×¼, namely ⅟16. Hence, the amount of the calculation required to obtain the result is reduced to ⅟64 comparing with that of the original. The unit size of the quantization is now changed two times as large as the original unit size and a DTM is calculated by magnifying the obtained result through interpolation on a lattice whose size is N/2×N/2. This gives a much better approximation of the equilibrium state than a stacking model. Therefore, the number of the iterations is very limited at the step of the quantization. A DTM in the quantization of the original size is obtained by recursively executing the similar procedure which magnifies the result through interpolation.

An example of the constitution of the present embodiment is as follows.

(1) The scale of the input contour data is reduced to ¼ in both sides, and a ¼ scale DTM is made by the apparatus of Embodiment 2. (It should be noticed that every lattice in this constitution expresses the original domain D with different quantizations.)

(2) The above result is magnified two times through interpolation on a lattice with N/2×N/2 points.

(3) The above magnified result is regarded as the initial model and the scale of the input contour data is reduced to ½ in both sides. A ½ scale DTM is made by the second means of the apparatus of Embodiment 2, using these as the boundary values.

(4) The above result is magnified two times through interpolation on the original lattice.

(5) The above magnified result is regarded as the initial model. The input contour data is used as the boundary values and an original scale DTM is made by the second means of the apparatus of Embodiment 2.

In the above example, the scale ratio of 2 is only used either for the reduction or the magnification at each step but other ratio can be used. Even it can be changed at every step of the quantizations. It is also not necessary to take ¼ as the starting scale ratio.

It is not suitable to calculate an elevational value of the interpolated point from that of the nearest adjacent points by using linear interpolation such as a plane fitting. The ridges and the valleys are neglected and the flatness is enlarged by such the interpolation. It is difficult to restore the lost unevenness from the second means and the ridges and the valleys are being crushed.

Figure 4:
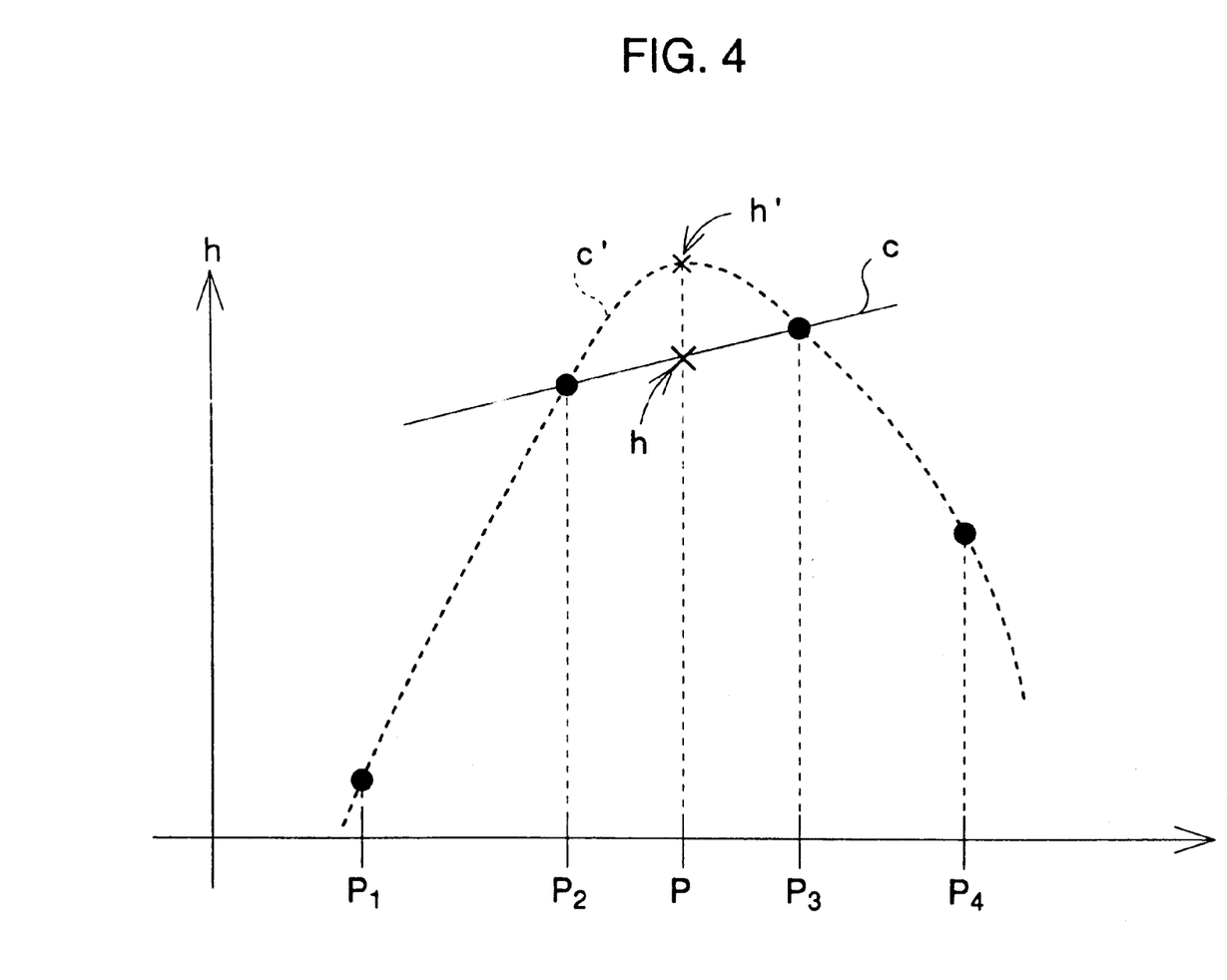
FIG. 4 is a schematic profile showing the discrepancy between the two interpolation methods in Embodiment 1 of the present invention.

The unevenness of terrain can, however, be interpolated by a cubic fitting with such the least-square method or Lagrange interpolation. A schematic profile of terrain is shown in FIG. 4 to explain the interpolation, where the axis of abscissa represents the x-axis and the axis of ordinate represents that of elevational values. The points $P_1$, $P_2$, $P_3$ and $P_4$ have known elevational values and P is a point where elevational value is interpolated. The solid line c is the profile of a linearly interpolated plane and the broken line c' is the profile of an interpolated curved surface in higher order. The elevational value at the point P is h for the linear interpolation and h' for the higher order interpolation. The discrepancy occurs between them as shown in the figure. The elevational value h' gives a summit whereas h simply a plateau. It is therefore better to use a higher order interpolation for the magnification of DTM through interpolation.

The above method is known as a fast solution for partial differential equations. It has been applied to such a boundary problem as Laplace equation and has an effect several times faster than the ordinary method on speed of calculation. Nevertheless, its effectiveness has not been fully utilized in the conventional use.

It is quite clear from its constitution that it is most effective in obtaining a rough solution when the magnitude of frequency of the solution gradually decreases as the frequency increases. In the conventional problem, the solution does not have such structure so called fractal (or self-similar) structure, and further the strictness of result is required for most of time.

On the contrary, these factors become advantages for a terrain reproduction problem. In recent years, it is elucidated that a terrain model has fractal structure from the success of fractal science in geomorphology, and the strictness of result is not substantially required for the reproduction problem.

According to the test using contour data of several actual terrains, it is possible to accelerate the calculation speed by several decadal times to about hundred times. Thus if it is compared with that of the conventional ordinary problems, the effect is more than ten times. The remarkable effect must be realized that it is more than a known method simply applied to the new problem.

By using this fast calculation method, the number of iterations of the smoothing operator can be tremendously reduced and this suppresses the smoothing on areas of ridge or valley. Accordingly, a DTM is obtained with sharp and clear ridges and valleys.

EMBODIMENT 4

Figure 7:
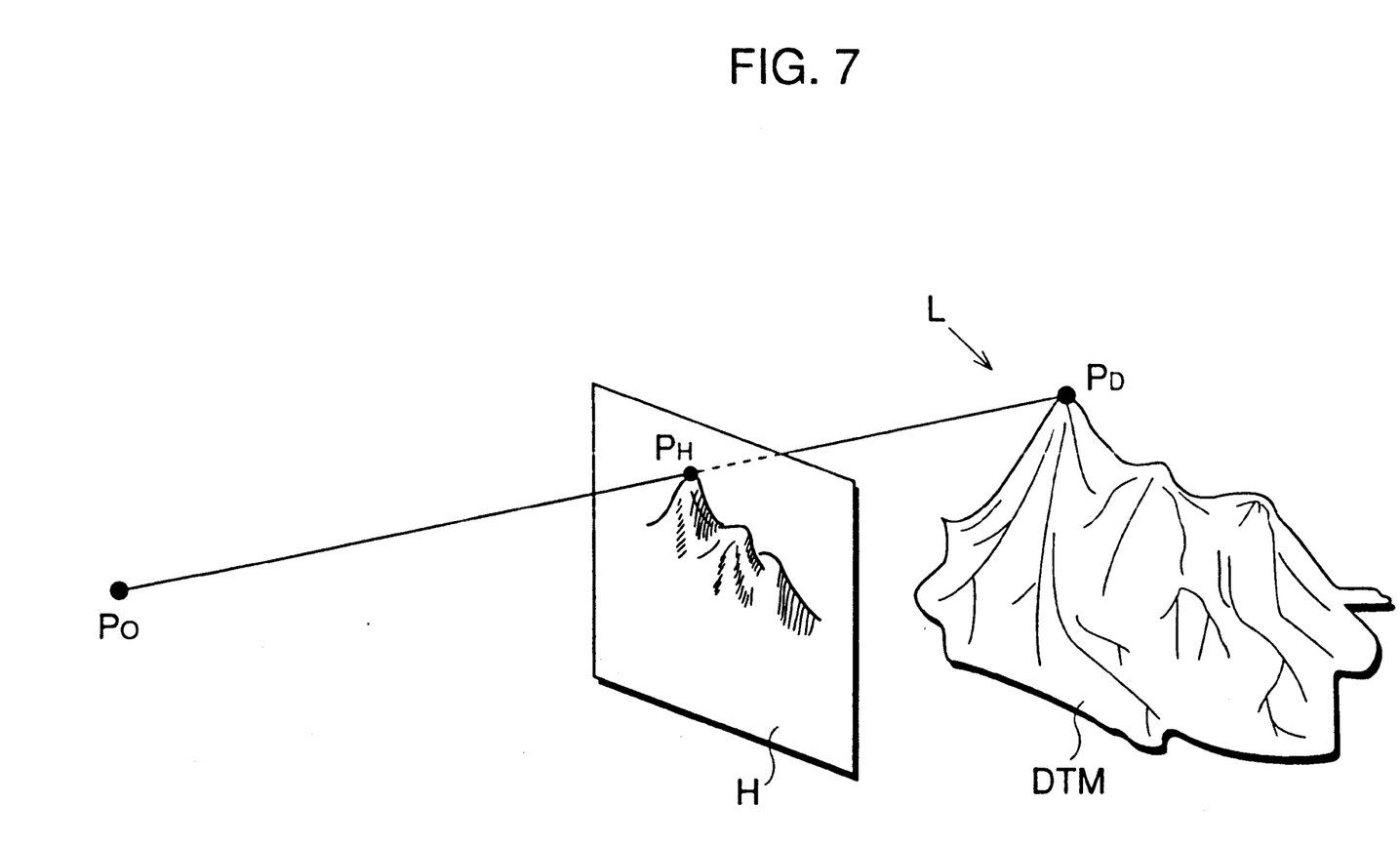
FIG. 7 is a schematic view showing the visualization of a DTM by three-dimensional projection in Embodiment 4 of the present invention.

In a fourth embodiment, a display output process which visualize a DTM is explained referring to FIG. 7. The process of three-dimensional projection is here given as an example. It comprises in the following steps:

(1) A DTM is produced by the apparatus of Embodiment 3. The modificatory filter in claim 6, which uses the smoothing operator T of Embodiment 2, is applied to the DTM.

(2) An imaginary observation point ($P_o$), an imaginary light source (L) and an imaginary projection plane (H) are set first. Then each point of the DTM ($P_D$) is projected to the projection plane. At the same time, a tone of each point of the DTM on the projection plane ($P_H$) is determined by at least one from among the following elements;

a) the position of the point from the observation point,
b) the elevational value of the point,
c) the gradient of the surface at the point,
d) the ray direction at the point, and
e) the irradiance at the point.

As the projection method, a known method such as z-buffer or ray-tracing can be used.

Further, a DTM can be also visualized by directly determining a tone of each point of a DTM by at least one from among b) to e) without an imaginary observation point and an imaginary projection plane.

(3) The obtained toned figure is shown on a screen or printed out.

According to Embodiment 4, fine folds, ridges and valleys clearly appear, and the natural terrain is successfully visualized as a whole.

While the preferred embodiments of the invention has been described, such description is for illustrative purpose only, and it is to be understood that changes and variations may be made without departing from the spirit or scope of the following claims.

What is claimed is:

1. A terrain model production apparatus comprising:
   a first means for setting an initial terrain model calculated as a function defined on two-dimensional plane from contour data; and
   a second means for producing a terrain model by solving a boundary value problem including an operator which smoothes elevational values of a terrain model along flowing water lines or their neighborhoods with said contour data as boundary values by an iterative method with said initial terrain model.

2. A terrain model production apparatus according to claim 1, wherein said operator includes an integration means for at least locally calculating the flowing water lines by integrating the gradient vector field of a terrain model, which is calculated beforehand and a smoothing means for smoothing unevenness of the elevational values on each flowing water line of said terrain model along the respective flowing water line or its neighborhoods.

3. A terrain model production apparatus according to claim 1, wherein said operator includes a detection means for finding a ridge area and a valley area of a terrain model and a smoothing means for operating two-dimensionally in the neighborhoods of a point Where said gradient vector becomes zero, said smoothing means reducing the degree of the smoothing in an area found by said detection means.

4. A terrain model production apparatus according to claim 1 further comprising:
   a third means for producing a terrain model of low precision from said first means and second means by setting a quantization unit in a defined domain of the terrain model larger than required precision;
   a fourth means for producing the terrain model by applying said second means to the initial value set by changing said quantization unit smaller and correspondingly magnifying said terrain model through interpolation; and
   a fifth means for recursively producing the terrain model by iteratively using the fourth means till reaching the required precision.

5. An apparatus according to claim 4, wherein said magnification through interpolation is a higher order interpolation using the elevational values of larger area than the nearest neighbourhood of the interpolation points.

6. A terrain model modification apparatus comprising:
   means for storing a terrain model as an initial value; and
   a modificatory filter operable once or recursively on the stored terrain model which smoothes elevational values along flowing water lines or their neighborhoods.

7. A terrain model production method comprising:
   a first step of setting an initial terrain model calculated as a function defined on two-dimensional plane from contour data; and
   a second step of producing a terrain model by solving a boundary value problem including an operator which smoothes elevational values of a terrain model along flowing water lines or their neighborhoods with said contour data as boundary values by an iterative method with said initial terrain model.

8. A terrain model visualization method comprising:
   a first step of producing a terrain model by the method of claim 7;
   a second step of determining a tone of a point of the terrain model by setting at least one imaginary light source and using at least one element from among elements which are the elevational value of the point, the gradient vector of the terrain surface at the point, the ray direction at the point and the irradiance at the point; and
   a third step of visualizing a tone determined by the second step.

9. A recording medium in which a visualized data produced by a method of claim 8 is stored.

10. A method for printing a terrain model, comprising the steps of:
    setting a toned figure produced by a method of claim 8; and
    printing the toned figure.

11. A terrain model print produced by a method of claim 10.

12. A projected terrain model visualization method comprising:
    a first step of producing a terrain model by the method of claim 7;
    a second step of projecting a point of the terrain model with setting an imaginary observation point, an imaginary projection plane and at least one imaginary light source;

a third step of determining a tone of a point of the terrain model by using at least one element from among elements which are the elevational value of the point, the position of the point from the observation point, the gradient vecto of the terrain surface at the point, the ray direction at the point and the irradiation at the point; and a fourth step of visualizing a tone determined by the third step.

13. A recording medium in which a visualized data produced by a method of claim 10 is stored.

14. A method for printing a terrain model, comprising the steps of:

setting a toned figure produced by a method of claim 12; and printing the toned figure.

15. A terrain model print produced by a method of claim 14.

16. A recording medium in which a terrain model produced by a method of claim 7 is stored.

17. A terrain model production method comprising:

a first step of setting contour data as boundary values; and a second step of calculating a terrain model as a function defined on two-dimensional plane by at least simulating rain erosion under a boundary condition set by the first step.

18. A recording medium in which a terrain model produced by a method of claim 17 is stored.

19. In a terrain modeling method operable on a computer for reproducing a terrain model with geomorphological consistency and natural features including folds, the improvement comprising:

a first step of setting a terrain model as an initial value; and a second step of operating an operator once or recursively which smoothes elevational values of the terrain model along flowing water lines or their neighborhoods.

20. A recording medium in which a computer program is stored, said program being provided for executing:

calculating a terrain model as a function defined on a two-dimensional plane from contour data and setting said model as an initial terrain model; and producing a terrain model by solving a boundary value problem including an operator which smoothes elevational values of a terrain model along following water lines or their neighborhoods with contours as the boundary values by an iterative method with said initial terrain model.

* * * * *

UNITED STATES PATENT AND TRADEMARK OFFICE
CERTIFICATE OF CORRECTION

PATENT NO.   : 6,272,448 B1
DATED        : August 7, 2001
INVENTOR(S)  : Ishii

It is certified that error appears in the above-identified patent and that said Letters Patent is hereby corrected as shown below:

Column 9,
Line 55, "or their neighborhoods" should read -- and their neighborhoods --.

Column 10,
Line 3, "Where" should read -- where --.
Line 27, "or their neighborhoods" should read -- and their neighborhoods --.
Line 35, "or their neighborhoods" should read -- and their neighborhoods --.

Column 11,
Line 5, "vecto" should read -- vector --.
Line 6, "irradiation" should read -- irradiance --.
Line 11, "claim 10" should read -- claim 12 --.
Lines 26-27, "a boundary condition set by the first step." should read -- the boundary values set by the first step along flowing water lines and their neighborhoods --.

Column 12,
Line 11, "or their neighborhoods" should read -- and their neighborhoods --.
Line 19, "following" should read -- flowing --.
Line 20, "or their neighborhoods" should read -- and their neighborhoods --.

Signed and Sealed this

Twenty-third Day of July, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.     : 6,272,448 B1
DATED          : August 7, 2001
INVENTOR(S)    : Ishii It is certified that error appears in the above-identified patent and that said Letters Patent is hereby corrected as shown below:

<u>Title page,</u>
Item [73] Assignee, delete "[73] Assignee: Kobashigawa (JP)"

Signed and Sealed this

Sixteenth Day of September, 2003

JAMES E. ROGAN
*Director of the United States Patent and Trademark Office*